March 1, 1966    H. R. NILSSON ETAL    3,237,524
REVERSIBLE ROTARY PISTON MOTORS OF THE SCREW ROTOR TYPE
Filed Nov. 3, 1964    7 Sheets-Sheet 3

INVENTORS
HANS ROBERT NILSSON
LAURITZ BENEDICTUS SCHIBBYE
BY
ATTORNEY

INVENTORS
HANS ROBERT NILSSON
LAURITZ BENEDICTJS SCHIBBYE
BY
ATTORNEY

March 1, 1966  H. R. NILSSON ETAL  3,237,524
REVERSIBLE ROTARY PISTON MOTORS OF THE SCREW ROTOR TYPE
Filed Nov. 3, 1964  7 Sheets-Sheet 6
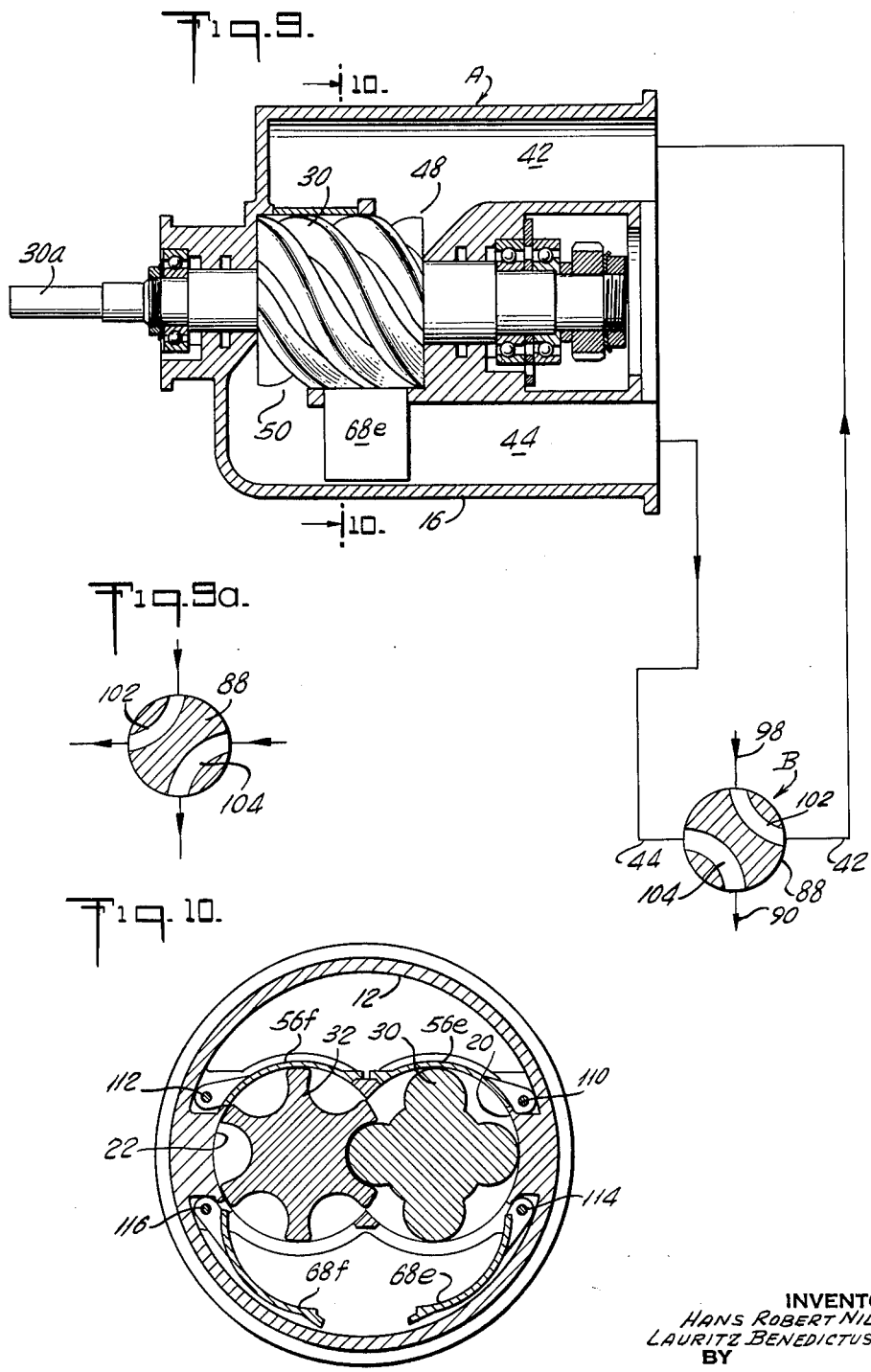
INVENTORS
HANS ROBERT NILSSON
LAURITZ BENEDICTUS SCHIBBYE
BY
ATTORNEY March 1, 1966    H. R. NILSSON ETAL    3,237,524
REVERSIBLE ROTARY PISTON MOTORS OF THE SCREW ROTOR TYPE
Filed Nov. 3, 1964    7 Sheets-Sheet 7
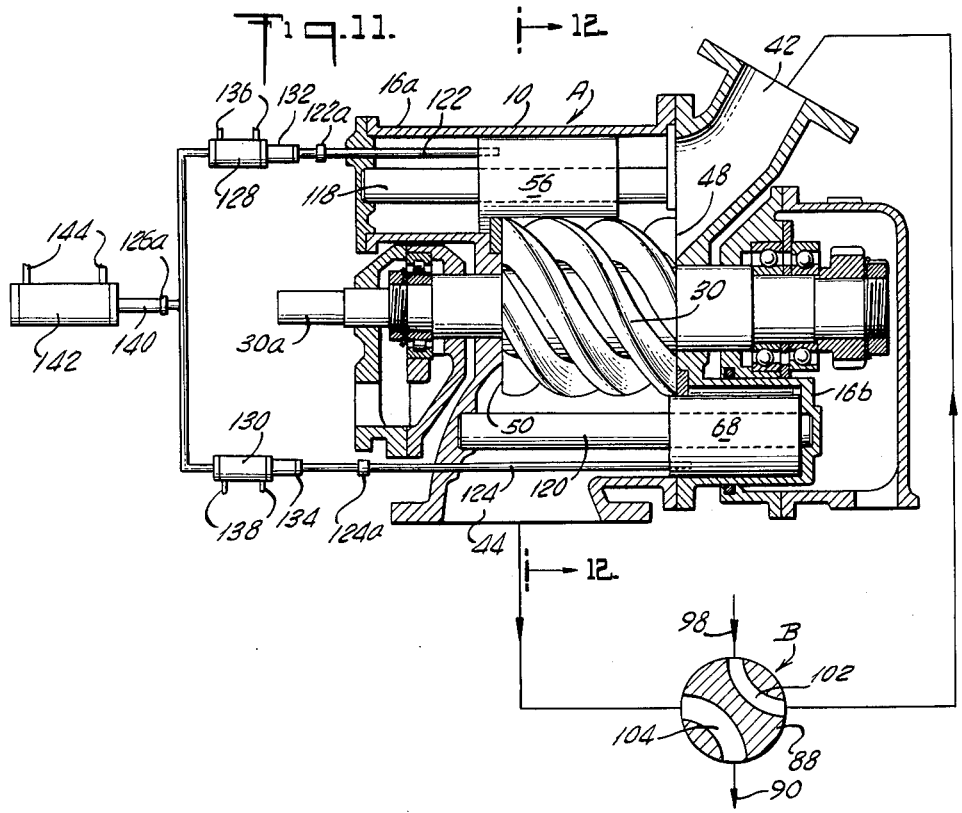
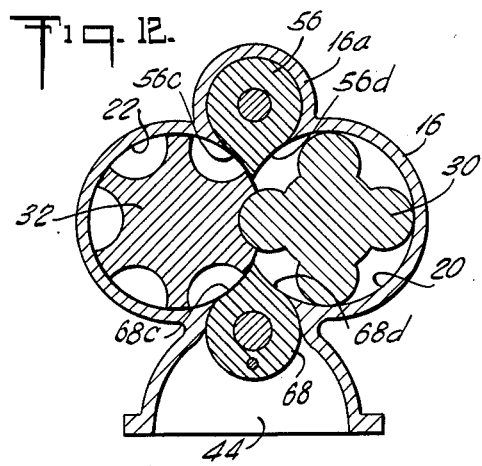
INVENTORS
HANS ROBERT NILSSON
LAURITZ BENEDICTUS SCHIBBYE
BY
ATTORNEY

United States Patent Office 3,237,524
Patented Mar. 1, 1966

3,237,524
REVERSIBLE ROTARY PISTON MOTORS OF THE SCREW ROTOR TYPE
Hans Robert Nilsson, Ektorp, and Lauritz Benedictus Schibbye, Saltsjo-Duvnas, Sweden, assignors to Svenska Rotor Maskiner Aktiebolag, Nacka, Sweden, a corporation of Sweden
Filed Nov. 3, 1964, Ser. No. 408,613
11 Claims. (Cl. 91—84)

This application is a continuation-in-part, replacing our copending application Serial No. 36,766, filed June 17, 1960, now abandoned.

The present invention relates to rotary piston motors of the expansible chamber type for expanding elastic motive fluid. More particularly, the invention relates to such motors of the kind having expansion or working chambers formed by the intermeshing action of cooperating male and female rotors provided with helical lands and grooves and operating in appropriate casing structures provided with suitable inlet and exhaust ports for the motive fluid to be expanded in the motor.

The primary object of the present invention is to provide new and improved control valve structure for such motors for selectively effecting the reversal and/or the power output thereof. For a better understanding of the nature of the above-noted general objects and of the nature of other and more detailed objects which will become apparent as this specification proceeds, reference may best be had to the ensuing description of different embodiments of apparatus for carrying the invention into effect, to be taken in conjunction with the accompanying drawings illustrative thereof and forming a part of this specification.

In the aforesaid drawings:

FIG. 9 is a longitudinal view, partly in section and partly in elevation, of a modified form of reversible motor, shown in conjunction with a schematically indicated reversing valve;

FIG. 9a is a view showing one of the valves illustrated in FIG. 9 in an operating position different from that shown in FIG. 9;

FIG. 10 is a transverse section taken on the line 10—10 of FIG. 9;

FIG. 11 is a view, partly in section and partly in elevation of still another modification of reversible motor unit, shown in more or less schematically illustrated reversing valve structure and operating mechanism therefore capable not only of effecting reversal of the motor but also of regulating the power output developed by the motor;

FIG. 12 is a transverse section taken on the line 12—12 of 11.

Figure 1:
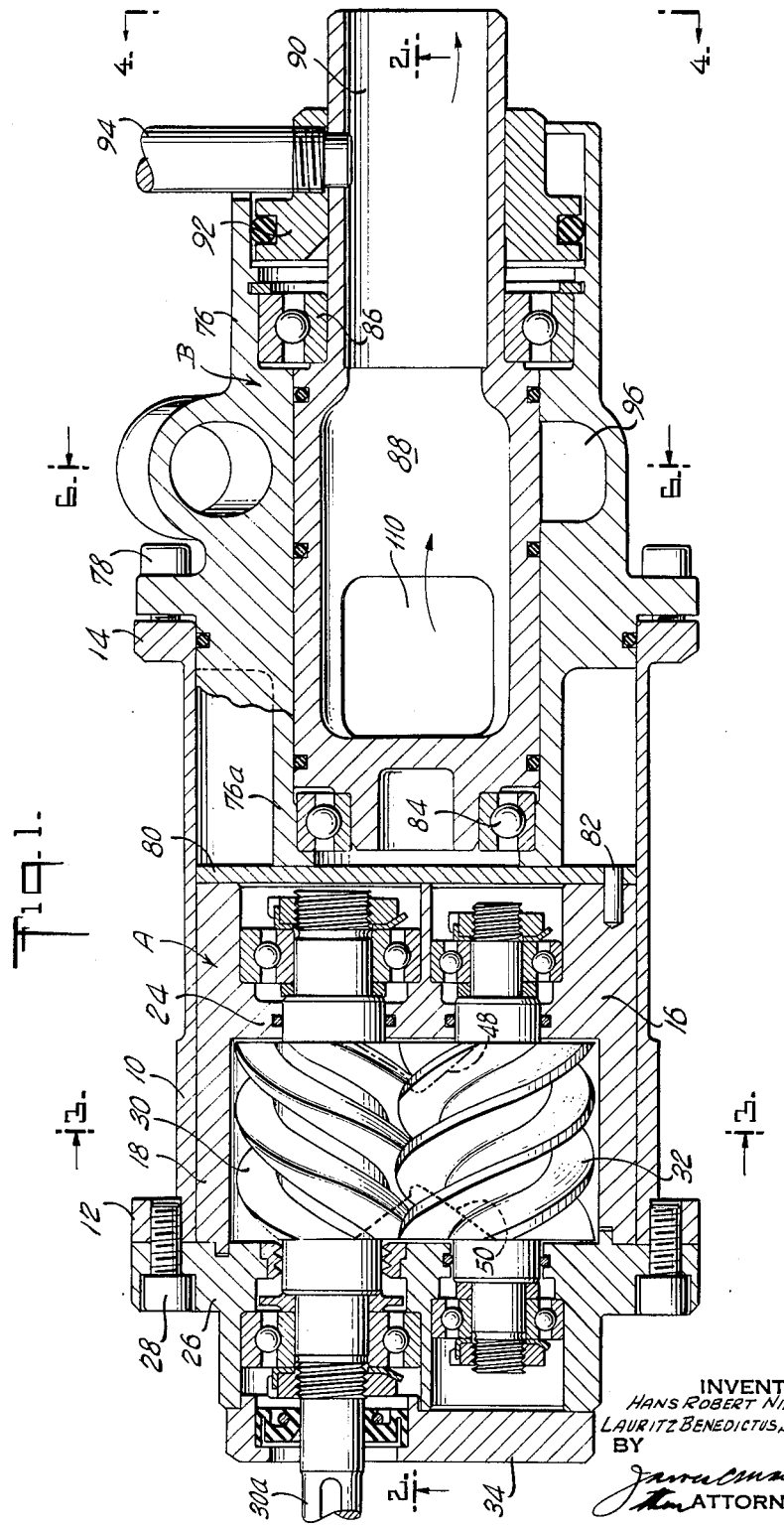
FIG. 1 is a longitudinal section, taken on the line 1—1 of FIG. 2, of a reversible motor unit embodying the invention.

Referring now to the embodiment shown in FIGS. 1 to 8 inclusive, the reversible motor unit shown comprises a motor component indicated generally at A and a reversing valve unit component indicated generally at B. The motor component A comprises an outer cylindrical shell 10 provided with flanges 12 and 14 at its opposite ends. The shell 10 is in surrounding engagement with a motor casing 16 having an open ended barrel portion 18 providing two intersecting parallel cylindrical bores 20 and 22 and an end wall portion 24 forming a closure for one end of these bores. The opposite ends of these bores are closed by means of a closure plate 26, secured by studs 28 to the flange 12 of the outer shell 10.

Rotors 30 and 32 are mounted in the bores 20 and 22 respectively, the rotor shafts being suitably supported by anti-friction bearings carried by an extension at one end of the casing 18 and by the end plate 26 the rotors are provided with intermeshing helical lands and grooves the wrap angles of which are less than 360°, the lands and grooves of one rotor, in this case rotor 30, which is usually considered the male rotor, lying substantially entirely without the pitch circle of the rotor, and the lands and grooves of the other rotor 32, which is usually considered the female rotor lying substantially entirely within the pitch circle of the rotor. While insofar as the present invention is concerned the specific profiles of the lands of the rotors is not critical, they may advantageously be of the form disclosed in Nilsson Patent No. 2,622,787, granted December 23, 1952, as indicated in FIG. 3 of the drawings.

In the present construction the male rotor shaft part 30a extends through a suitable cover plate 34 to provide the power output member of the motor.

Figure 2:
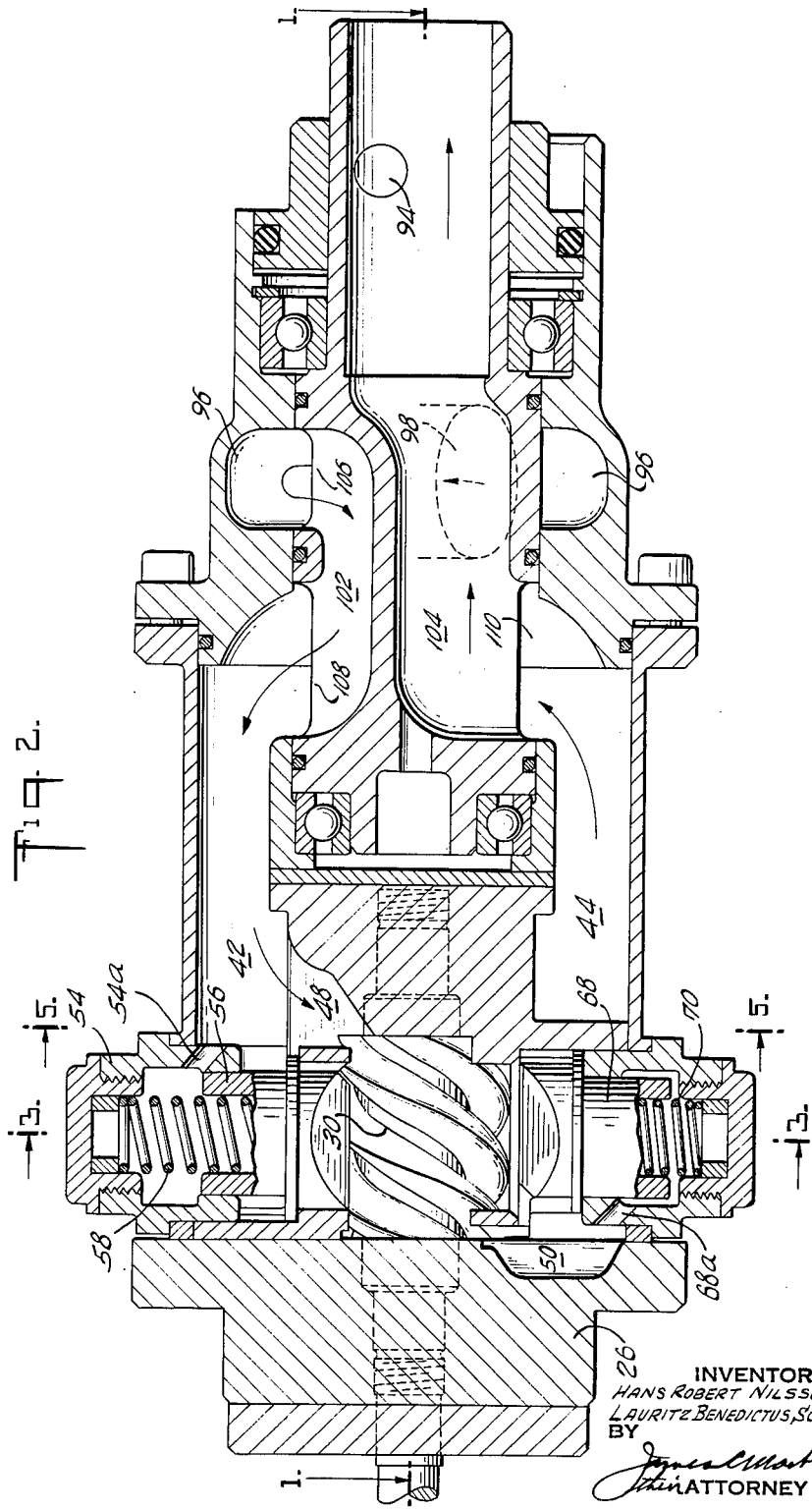
FIG. 2 is a longitudinal section, taken on the line 2—2 of FIG. 1.
Figure 3:
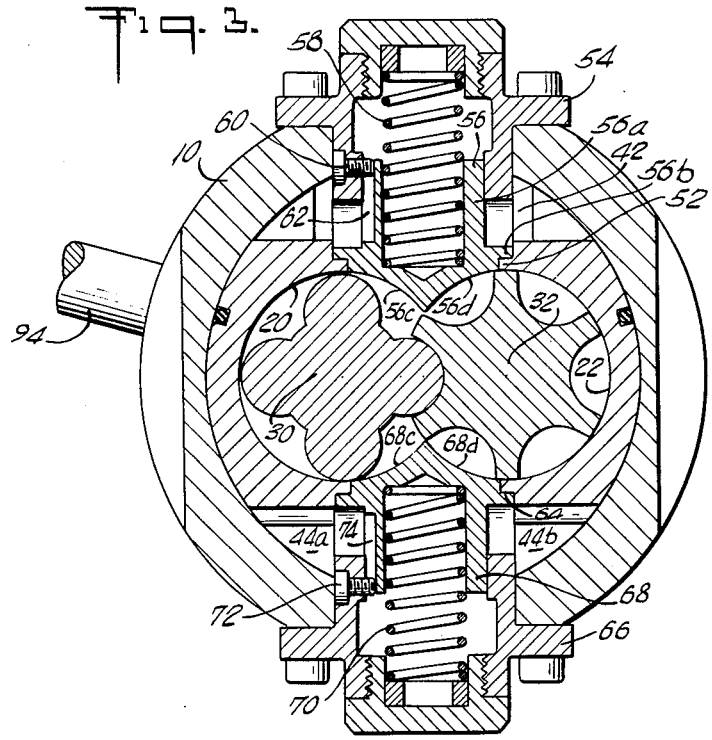
FIG. 3 is a transverse section taken on the line 3—3 of FIG. 2.
Figure 5:
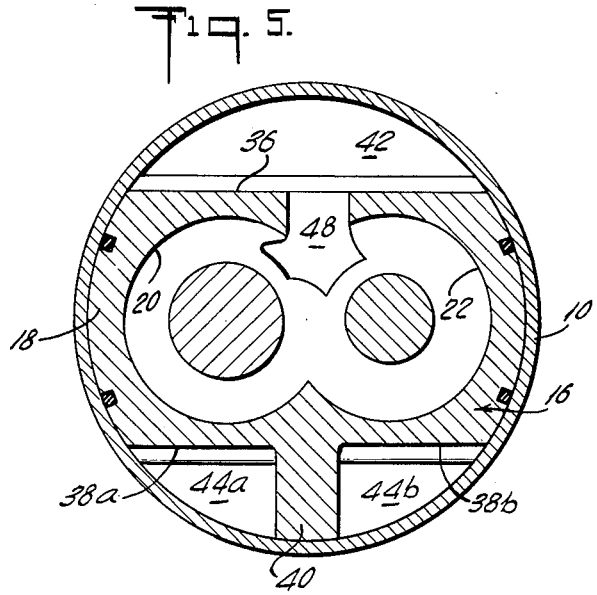
FIG. 5 is a transverse section taken on the line 5—5 of FIG. 2.

As will be seen from FIGS. 3 and 5 the casing 16 is provided with flat upper and lower faces 36 and 38 respectively, the latter face being divided into two adjacent side by side portions separated by a central longitudinally extending centering flange 40 engaging the inner wall of the shell 10. Between these surfaces and the confronting portions of the wall of shell 10 there are formed two longitudinally extending passages 42 and 44a, 44b for flow of motive fluid to and from the working space of the motor formed by the intersecting bores 20 and 22. At one end the passage 42 terminates in a port 48 (see FIG. 5) communicating with the bores 20 and 22, this port having an axial flow portion as will be seen from FIG. 2 and a radial flow portion indicated by construction lines in FIG. 1. The passages 44a, 44b also terminate at one end in a port 50 communicating with the working space of the motor at the opposite ends of the bores from the port 48, and on the opposite side of the plane through the coplanar rotor axes. This port also provides an axial flow portion established through the recess 50a in the end plate 26, and a radial flow portion indicated by dotted lines in FIG. 1. As will later be explained, ports 48 and 50 both constitute high pressure ports for the admission of pressure fluid to be expanded in the motor, these ports being used as such in alternation, depending upon the direction of rotation desired for the operation of the motor.

Longitudinally adjacent to the port 48, the casing 16 is provided with a central circular bore, the diameter of which constitutes a major portion of the overall length of the rotors, this bore being formed to provide a valve seat 52. The casing 10 is bored, in alignment with the valve seat 52, to receive the valve casing 54 of an exhaust valve 56. Valve 56 has a piston portion 56a slantably mounted in the casing 54, a valve seat flange 56b adapted to engage the valve seat 52 and cylindrically arcuate inner faces 56c and 56d shaped to form portions of the walls of the bores 20 and 22 within the circle of the valve seat 52, when the valve 56 is closed. The valve is biased to closed position by means of spring 58, and turning of the valve about its axis is prevented by means of a set screw 60 sliding in an appropriate key slot 62 in the piston portion of the valve. Similarly, on the opposite side of the casing a central bore provides a valve seat 64, adapted to be close by a second exhaust valve 68 slidably carried in a valve casing 66. Valve 68 is in all respects like valve 56 just described and is biased to closed position by the spring 70, while being restrained against rotation by the set screw 72 working in slot 74.

Referring now to the reversing valve component B, this comprises an outer annular housing 76 secured by studs 78 to the flange 14 of the shell 10 and having a portion 76a extending inwardly of the flange 14 into abutting relation with a separating plate 80 the position of which is fixed relative to the casing 18 by the pin 82. Rotatably carried by bearings 84 and 86 within the annular valve housing 76, is the hollow cylindrical reversing valve member 88, the open end 90 of which, carrying a suitably packed sealing plate 92 extends outwardly of the end of the valve housing. A radially extending operating handle 94 provides for manual manipulation of the valve. Intermediate its ends the valve housing 76 is cored out to provide a circumferentially extending inlet passage 96 in open communication at its inner periphery with the external wall of the hollow valve member 88 and terminating in a tangentially direction inlet opening 98 adapted to be connected with any suitable source of elastic motive fluid under pressure.

Figure 6:
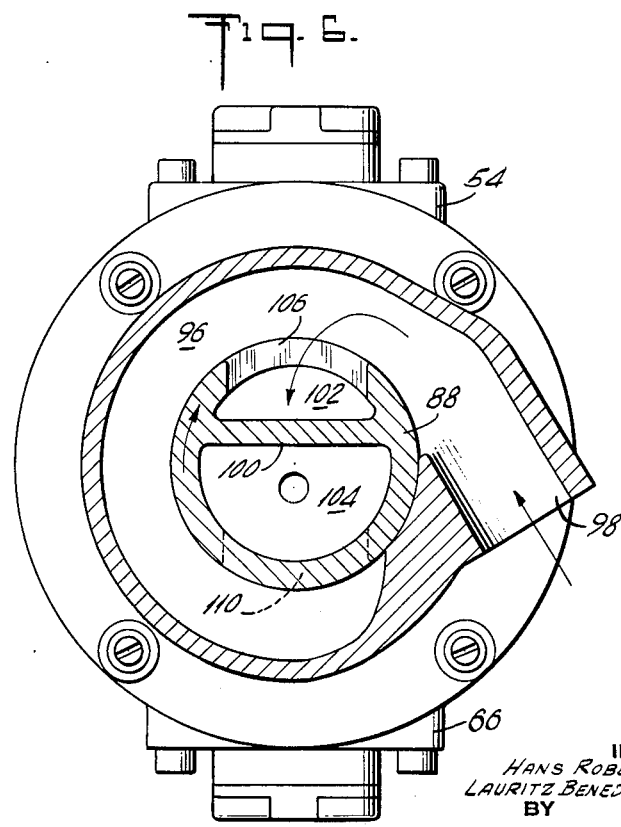
FIG. 6 is a transverse section taken on the line 6—6 of FIG. 1.

As will be seen more clearly from FIGS. 2 and 6 the valve member 88 is provided with a longitudinally extending internal partition 100 located as a chord offset from the diameter of the valve member so as to provide two passages of unequal cross sectional area the passage 102 being of smaller area than the passage 104.

In the same transverse plane as that of the inlet passage 96 in the valve housing the valve member 88 is provided with an inlet port 106 for establishing communication between the inlet passage 96 and the passage 102 within the valve 88, in various positions of rotation of the valve throughout a range of turning movement of 180° of the valve. In line with port 106 the valve member 88 is provided with a second port 108, which is in effect a transfer port, providing communication between the valve passage 102 and the passage 42 leading to the port 48, when the valve member 88 is in the position shown in FIGS. 1, 2 and 6. The valve member 88 is further provided with an exhaust port 110 located in the same transverse plane as the port 108 and diametrically opposite port 108, to provide communication between the valve passage 104 leading to the exhaust outlet 90 and either the passage 42 communicating with the motor port 48 or the passage 44 communicating with the motor port 50. In the position of the valve member 88 shown in FIGS. 1, 2 and 6 port 110 provides communication between the motor passage 44 and valve passage 104.

With valve member 88 in the position shown in FIGS. 1, 2 and 6 and with pressure fluid being supplied to the inlet 98, the flow of the fluid will be as indicated by the arrows in these figures, through inlet passage 96 in the reversing valve housing, port 106, passage 102 and transfer port 108 in the reversing valve member and passage 42 in the motor to the port 48, which in this instance acts as a high pressure inlet port for the motive fluid to be expanded in the motor. Under these conditions the valve 56 remains closed under the influence of the valve spring 58, the valve being substantially balanced insofar as fluid pressure is concerned by the admission of high pressure fluid to the back of the valve through the balancing port 54a in the valve housing 54. Thus the area of admission of high pressure fluid to the working space of the motor is restricted to the area of the port 48.

The helical lands and grooves of the rotors form between themselves and the confronting portions of the motor casing, chevron-shaped expansion chambers to which the high pressure motive fluid is admitted and which upon expansion therein causes the rotors to revolve in the directions indicated by the arrows shown thereon in FIG. 1. Fluid expanded in such chambers may be exhausted through the port 50 and passage 44 in the motor through the exhaust port 110 and passage 104 in the reversing valve to the outlet 90, but obviously the greatly enlarged volume of the expanded motive fluid requires an exhaust passage of larger cross-sectional area than that of the port 50 if satisfactory operation is to be achieved. Since the final pressure to which the fluid is expanded within the motor is higher than that of the ambient atmosphere to which the fluid is finally exhausted, the exhaust valve 68 is automatically opened by the differential fluid pressure against the action of spring 70 to provide the required exhaust passage of relatively large area for discharging the expanded fluid from the unit.

Figure 4:
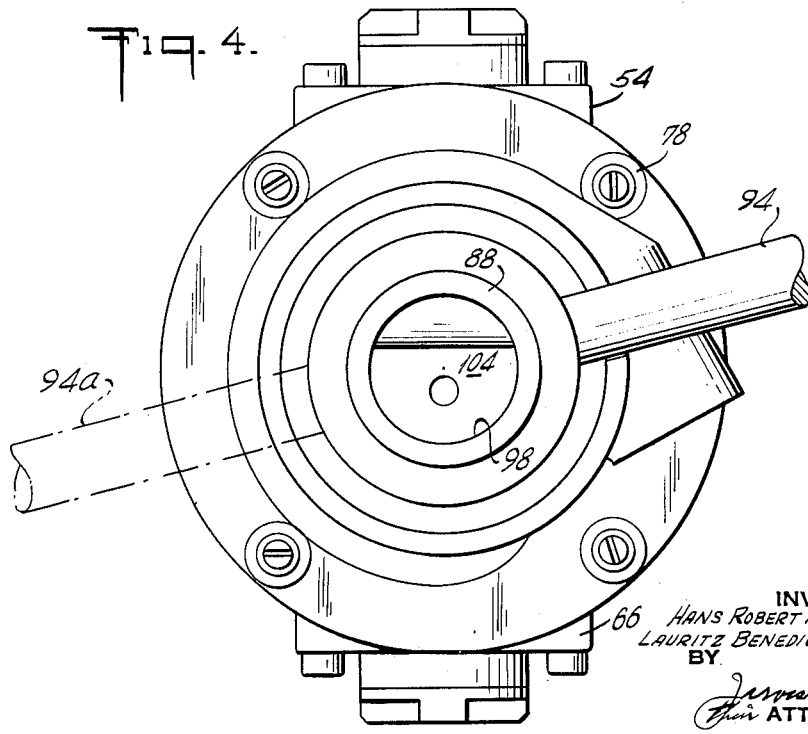
FIG. 4 is a transverse elevation taken on the line 4—4 of FIG. 1.
Figure 7:
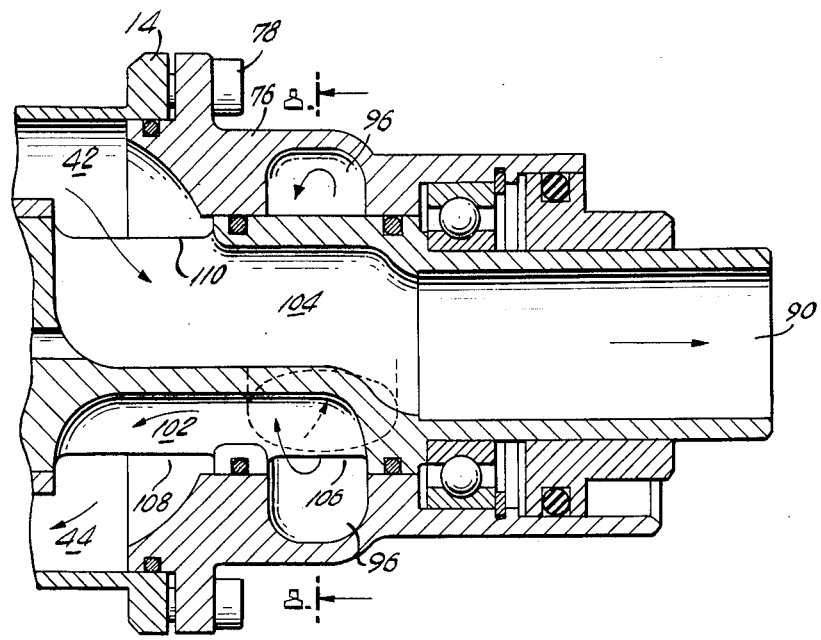
FIG. 7 is a fragmentary section showing a part of the structure of FIG. 1 with a valve element thereof in a different operative position.
Figure 8:
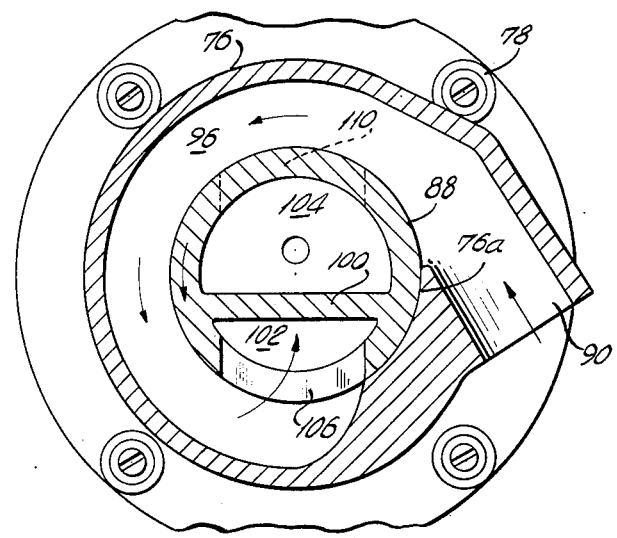
FIG. 8 is a section taken on the line 8—8 of FIG. 7.

In FIGS. 7 and 8 the action of the apparatus is illustrated, when the reversing valve is shifted by movement of the control handle 94 from the full line position shown in FIG. 4 to the broken line position 94a shown in that figure. In the latter position, the position of the valve member 88 is as indicated in FIGS. 7 and 8 with the flow of the motive fluid being as indicated by the arrows in those figures. In this position of the parts, the valve inlet port 106 leading to the passage 102, still receives high pressure motive fluid from the inlet passage 96, the fluid passing by way of passage 102, transfer port 108 and passage 44 to the port 50 for admission to and expansion in the working chambers of the motor.

From FIG. 1 it will be observed that the apex ends of the chevron-shaped working chambers formed above the rotors point to the left as viewed in this figure and upon admission of the motive fluid through the inlet port 48 at the right hand end of the rotors, expansion of the fluid causes the rotors to turn in the direction indicated by the arrows in FIG. 1.

Chevron-shaped working chambers, similar to those formed above the rotors and appearing in FIG. 1, are formed below the rotors, but the apex ends of these latter chambers point to the right rather than to the left ends of the rotors, and with the motive fluid admitted to the inlet port 50 below the rotors and at the left end thereof, due to shifting of the reversing valve as just described, the expansion of the motive fluid operates to turn the rotors in the direction opposite that indicated by the arrows of FIG. 1.

When motive fluid is admitted to the inlet port 50 for reverse drive, valve 68 is held closed by the action of spring 70, the fluid pressure thereon being substantially balanced by virtue of the action of the balancing port 68a. Likewise, under this condition the exhaust valve 56 is opened by differential pressure to provide for substantially free flow of low pressure exhaust fluid through passage 42 port 110 and passage 104 to the outlet 90.

In the apparatus just described differential fluid pressures will exist at the joints between numerous of the different parts inclusive of those which are relatively fixed with respect to each other as well as those which are relatively movable. Such joints are all appropriately sealed by suitable rubber, neoprene or other equivalent packing or sealing means as conventionally indicated in the drawings, such construction however being purely conventional and not requiring detailed description.

In describing the foregoing modification, reference has been made to the reversing valve component embodying the reversing valve member 88, and to the valves 56 and 68 as exhaust valves. These latter valves, which are automatic in their action in this embodiment of the apparatus have been so described since they are open to act only as exhaust valves, whereas the fixed ports 48 and 50, being open at all times, act sometimes as inlet ports and sometimes as exhaust ports, depending upon the direction of rotation of the motor.

Furthermore, it is to be noted that in effecting forward and reverse operation of the motor two entirely different sets or series of working chambers are employed. With the apparatus set for operation as shown in FIGS. 1 through 8, which for convenience may be considered as forward operation, the working chamber utilized as expansion chambers are those situated above the rotors as seen in FIGS. 1 and 2, the chevron-shaped chambers being defined at their base ends by the plane of the end wall portion 24 of the casing and the apex ends of the chambers moving away from this wall toward the opposite end wall as the rotors revolve in the manner indicated by the arrows and the volumes of the chambers increase.

A similar set or series of chevron-shaped chambers is formed beneath the rotors, the base ends of these chambers being determined by the plane of the end wall 26 and the apex ends of the chambers moving from right to left toward that wall to diminish the volume of the chambers when the rotors revolve in the direction shown by the arrows in FIG. 1. In other words, one set of chambers increases in volume simultaneously with decrease in volume of the other set of chambers in any given direction of rotation of the rotors. Operability of the device as a motor is therefore obtainable only by virtue of the reversing valve 88 and the exhaust valves 56 and 68, which may for convenience be generically referred to as auxiliary control valves, which operate to automatically open up to exhaust whichever one of the sets of chambers is diminishing in volume.

In FIGS. 9 and 10 there is illustrated another modification of apparatus embodying the invention. In this form the motor component A comprises a casing 16 providing bores 20 and 22 in which rotors 30 and 32 are situated and also providing fluid passages 42 and 44 leading to ports 48 and 50 respectively.

In this embodiment there is associated with port 48 two auxiliary control or exhaust valves 56e and 56f in the form of hinged flap valves freely movable about pivots 110 and 112 respectively, and as shown in FIG. 10 curved to provide portions of the wall of bores 20 and 22 when the valves are closed as shown in that figure.

Similarly, valves 68e and 68f are freely pivoted at points 114 and 116 respectively, being shown in FIG. 10 in open position.

The reversing valve component B, which may be of the form shown in the embodiment of FIG. 1 is illustrated by the schematic representation of the valve member 88 which is shown in a position directing motive fluid to port 48 as an inlet port and exhausting from passage 44 the fluid being exhausted through port 50 and auxiliary port area opened by the valves 68e and 68f.

In FIG. 9a the position of valve 88 is shown for effecting reversal of operation, directing motive fluid to port 50 as an inlet port and exhausting the fluid through port 48 and the auxiliary port area resulting from the opening of valves 56e and 56f.

In this embodiment of the apparatus the action of the auxiliary valves is also automatic in response to differential pressure developed thereon by the fluid admitted to and exhausted from the motor. With the valve arrangement shown in FIG. 9 valves 56e and 56f are closed by the differential pressure between that of the high initial pressure existing in passage 42 and the partially expanded pressure in the working chambers. In the position of the motor shown in figure, gravity aids this pneumatic closing force, but the latter is the controlling factor. In the position of the reversing valve member shown in FIG. 9a, admitting pressure fluid to passage 44, valves 68e and 68f would be closed by differential fluid pressure between that existing in the inlet passage 44 and that of the partially expanded fluid in the working chambers, while valves 56e and 56f would be opened by the difference in pressure between the working chambers and the ambient exhaust pressure existing in passage 42. In both cases the differential fluid pressure will be sufficient to overcome the action of gravity on the valve members to provide the controlling factor in positioning the valves.

While in many cases automatically operable auxiliary valves such as those described in connection with the preceding embodiments together with a simple reversing valve component of the kind hereinbefore described, which provides for throttling control and a neutral position as well as for full reversal, may be adequate, there may be instances where further control is desirable and in FIGS. 11 and 12 an embodiment is shown, providing such additional control.

In this embodiment the casing 16 is provided with hollow extensions 16a and 16b projecting respectively from the opposite ends of the main portion of the casing to provide housings for the auxiliary control valves 56 and 68, which in this instance are in the form of axially movable slide valves, slidably mounted upon the fixed shafts 118 and 120. In this figure the reversing valve member 88 of the component B is shown in a position delivering motive fluid to the port 48 of the motor component, valve 68 being shown in its extreme right hand position opening up the exhaust port area associated with port 50 to its maximum, and valve 56 being shown in a position for providing an inlet port 48 of normal area.

Valves 56 and 68 are positioned by control rods 122 and 124 respectively connected to a common yoke 126 through the medium of control cylinders 128 and 130 and their respectively associated pistons 132 and 134 which are in turn connected respectively to the control rods 122 and 124. Pressure fluid for controlling the positions of pistons 132 and 134 in their respective cylinders is admitted to and exhausted from the respective cylinders by conduits 136 and 138. The position of the yoke 126 is governed by piston 140 operating in control cylinder 142, the position of piston being governed by pressure fluid being admitted to and exhausted from the cylinder through conduits 144.

In order to effect reversal of the motor shown in FIG. 11 valve 88 is shifted to a position corresponding to that shown in FIG. 9a to admit motive fluid to channel 44 and exhausted from the channel 42. At the same time, the piston 140 is actuated in its cylinder to move the yoke 126 to the left and piston 134 actuated to move to the left in its cylinder, the combined movements of these pistons operating to shift valve 68 to the left to a position relative to the left hand ends of the rotors that valve 56 occupies relative to the right hand ends of the rotors in FIG. 11 to thus provide a suitable inlet port. Likewise actuation of piston 132 to the left in its cylinder 128, plus the movement of 140 acts to retract the valve 56 into the recess in the housing to a position corresponding to valve 68 in FIG. 11. These valves as shown in FIG. 12 are provided with inner surfaces 56c and 56d, and 68c and 68d, respectively, similar to the inner surfaces of the piston type valves shown in FIG. 3, to form continuations of the walls of the bores. The specific form of slide valve utilized in this modification is not new per se, being disclosed in Nilsson et al. Patent No. 3,088,659, granted May 7, 1963, the valves in that disclosure, however, being used for an entirely different purpose, namely, for varying the pressure ratio and/or the capacity of an elastic fluid compressor.

With the arrangement shown in FIG. 11, it will be noted that piston 132 may be moved to the left from the position shown, independently of the other parts, and if this piston is moved alone it will operate to shift valve 56 to the left, thus delaying the point of cutoff of admission of motive fluid to the working chambers. This affords means for increasing the power of the motor above normal power in order to take care of overloads. Likewise, movement of the piston 132 to the right, the possibility of which is indicated by the position of the stop 122a will advance the time of cutoff of motive fluid through the radial flow portion of port 48, thus reducing capacity, and if the axial flow area of the port is made sufficiently narrow may also act to advance the time of cutoff of all flow through the port.

Likewise, when the parts are adjusted for reverse operation of the motor, independent manipulation of piston 134 may be employed to vary the capacity of the motor.

While for purposes of illustration a fluid pressure system has been shown for controlling the positions of the auxiliary control valves and only manual control has been indicated for the reversing valve component, it will be understood that these means have been shown only in order to illustrate the principles of the invention, and that within the scope of the invention, other equivalent manual and/or power actuated control systems hydraulic, pneumatic or electrical may be employed and that any appropriate means may be employed to interconnect the controls for the reversing valve component and for the auxiliary valves.

The invention is accordingly to be understood as embracing all forms of construction of both the motor and reversing valve components and the control system therefore, falling within the scope of the appended claims.

We claim:

1. A reversible rotary piston motor comprising a casing structure providing a barrel portion with intersecting bores having coplanar axes located between end wall portions forming a working space and further providing diagonally located spaced apart ports for admission and exhaust of motive fluid to and from said working space, a first one of said ports being located on one side of the plane of said axes at one end of said bores and a second one of said ports being located on the opposite side of said plane at the opposite end of said bores, rotors having a wrap angle of less than 360° comprising a male rotor having lands provided with convexly curved flanks and intervening grooves the major portions of which lie outside the pitch circle of the male rotor and a female rotor having lands provided with concavely curved flanks and intervening grooves the major portions of which lie inside the pitch circle of the female rotor, the lands and grooves of said rotors intermeshing to form with confronting portions of the casing structure a first and a second series of chevron-shaped working chambers, the different series of chambers being formed respectively on opposite sides of said plane of said axes with the bases of the chambers being defined by the planes of the respectively opposite end wall portions of the casing structure at which said ports are respectively located and the apexes of the working chambers of said first series moving axially away from the base plane thereof while the apexes of said second series of chambers simultaneously move in the same axial direction toward the base plane of said second series of chambers when the rotors turn in intermeshing relation to provide a given direction of operation for the motor, whereby the volumes of the chambers of said first series increase and the volumes of the chambers of said second series decrease as the rotors revolve, said apexes moving axially in the opposite direction to cause the chambers of said first and said second series to decrease and increase respectively when said rotors revolve to reverse the direction of operation from said given direction, reversing valve means for selectively causing said motor to operate in desired direction comprising a reversible valve component movable to direct motive fluid to one or to the other of said ports to be expanded in one or the other of said series of chambers and auxiliary valve means associated with each of said ports automatically operable to enlarge the effective area of the port not receiving motive fluid, whereby to provide an appropriate exhaust area for exhausting expanded motive fluid from said working space of the motor.

2. Apparatus as defined in claim 1, in which said auxiliary valve means comprises two valve members, one associated with each of said ports, each of said valve members being biased to closed position by spring pressure and being opened against said pressure by differential fluid pressure between that of partially expanded fluid in said working space and that of the ambient atmosphere to which the motor exhausts.

3. Apparatus as defined in claim 2 in which said auxiliary valves are additionally biased to closed position by the differential pressure between the initial pressure of the motive fluid as admitted to the associated port and the pressure of the partially expanded fluid in confronting working chambers.

4. Apparatus as defined in claim 3 in which said auxiliary valves are of the piston type mounted to move in directions normal to the plane of the rotor axes, and in which the end faces of the valves form parts of the walls of said bores when the valves are closed.

5. Apparatus as defined in claim 1 in which said auxiliary valve means comprises pivoted flap valves each shaped to form a portion of the wall of one of said bores when the valve is closed.

6. Apparatus as defined in claim 5 in which said valves are arranged in pairs with one pair on each side of the plane of the rotor axes and with each pair associated with the port in the motor casing on the same side of said plane.

7. Apparatus as defined in claim 6 in which each valve of each pair forms a part of the wall of only one of said bores when the valve is closed.

8. Apparatus as defined in claim 5 in which the valve members are freely movable and are positioned in accordance with the action of differential fluid pressures acting thereon.

9. A reversible rotary piston motor comprising a casing structure providing a barrel portion with intersecting bores having coplanar axes located between end wall portions forming a working space and further providing diagonally located spaced apart ports for admission and exhaust of motive fluid to and from said working space, the first one of said ports being located on one side of the plane of said axes at one end of said bores and a second one of said ports being located on the opposite side of said plane at the opposite end of said bores, rotors having a wrap angle of less than 360° comprising a male rotor having lands provided with convexly curved flanks and intervening grooves the major portions of which lie outside the pitch circle of the male rotor and a female rotor having lands provided with concavely curved flanks and intervening grooves the major portions of which lie inside the pitch circle of the female rotor, the lands and grooves of said rotors intermeshing to form with confronting portions of the casing structure a first and a second series of chevron-shaped working chambers, the different series of chambers being formed respectively on opposite sides of said plane of said axes with the bases of the chambers being defined by the planes of the respectively opposite end wall portions of the casing structure at which said ports are respectively located and the apexes of the working chambers of said first series moving axially away from the base plane thereof while the apexes of said second series of chambers simultaneously move in the same axial direction toward the base plane of said second series of chambers when the rotors turn in intermeshing relation to provide a given direction of operation for the motor, whereby the volumes of the chambers of said first series increase and the volumes of the chambers of said second series decrease as the rotors revolve, and said apexes moving axially in opposite direction to cause the chambers of said first and second series to decrease and increase respectively when said rotors revolve to reverse the direction of operation from said given direction, reversing valve means for selectively causing said motor to operate in desired direction comprising a reversible valve component movable to direct motive fluid to one or to the other of said ports to be expanded in one or the other of said series of chambers and auxiliary valve means associated with each of said ports automatically operable to enlarge the effective area of the port not receiving motive fluid, whereby to provide an appropriate exhaust area for exhausting expanded motive fluid from said working space of the motor, said auxiliary valve means comprising two axially movable valve members, one associated with each of said ports, said valve members having inner surfaces forming portions of the walls of said bores, each of said valve members being movable toward and away from its associated port to increase or decrease the effective area of the port, and control means operative to simultaneously move said valve members to increase the effective area of one of said ports while decreasing the effective area of the other of said ports.

10. Apparatus as defined in claim 9 including additional control means for selectively moving either one of said valve members to alter the effective area of its associated port independently of the other of said valve members.

11. A reversible rotary piston motor comprising a casing structure providing a barrel portion with intersecting bores having coplanar axes located between end wall portions forming a working space and further providing diagonally located spaced apart ports for admission and exhaust of motive fluid to and from said working space, the first one of said ports being located on one side of the plane of said axes at one end of said bores and a second one of said ports being located on the opposite side of said plane at the opposite end of said bores, rotors having a wrap angle of less than 360° comprising a male rotor having lands provided with convexly curved flanks and intervening grooves the major portions of which lie outside the pitch circle of the male rotor and a female rotor having lands provided with concavely curved flanks and intervening grooves the major portions of which lie inside the pitch circle of the female rotor, the lands and grooves of said rotors intermeshing to form with confronting portions of the casing structure a first and a second series of chevron-shaped working chambers, the different series of chambers being formed respectively on opposite sides of said plane of said axes with the bases of the chambers being defined by the planes of the respectively opposite end wall portions of the casing structure at which said ports are respectively located and the apexes of the working chambers of said first series moving axially away from the base plane thereof while the apexes of said second series of chambers simultaneously move in the same axial direction toward the base plane of said second series of chambers when the rotors turn in intermeshing relation to provide a given direction of operation for the motor, whereby the volumes of the chambers of said first series increase and the volumes of the chambers of said second series decrease as the rotors revolve, and said apexes moving axially in the opposite direction to cause the chambers of said first and second series to decrease and increase respectively when said rotors revolve to reverse the direction of operation from said given direction, reversing valve means for selectively causing said motor to operate in desired direction comprising a reversible valve component movable to direct motive fluid to one or to the other of said ports to be expanded in one or the other of said series of chambers and auxiliary valve means associated with each of said ports automatically operable to enlarge the effective area of the port not receiving motive fluid, whereby to provide an appropriate exhaust area for exhausting expanded motive fluid from said working space of the motor, said reversing valve means comprising a valve housing extending axially from one end of the casing of said motor component, a hollow reversing valve member rotatably mounted in said housing, said valve member having a laterally opening inlet port and said housing having a circumferentially extending inlet passage registering with said inlet port in different positions of rotation of said valve member, said valve member further having a longitudinally extending transfer passage connecting said inlet port and a transfer port for directing motive fluid to different ones of the ports in said motor casing in different positions of rotation of said valve member, and said valve member further having a laterally opening exhaust port providing communication between the open end of the hollow valve member and one or the other of the ports in said motor casing in different positions of rotation of the valve to exhaust expanded motor fluid from the motor.

References Cited by the Examiner

UNITED STATES PATENTS

| 1,575,987 | 3/1926 | Gilman | 91—84 X |
| 1,740,704 | 12/1929 | Osgood | 91—84 |
| 3,088,658 | 5/1963 | Wagenius | 230—143 X |
| 3,088,659 | 5/1963 | Nilsson et al. | 103—120 X |

FOREIGN PATENTS 540,444   12/1931   Germany.

SAMUEL LEVINE, *Primary Examiner.*

KARL J. ALBRECHT, *Examiner.*